UNITED STATES PATENT OFFICE.

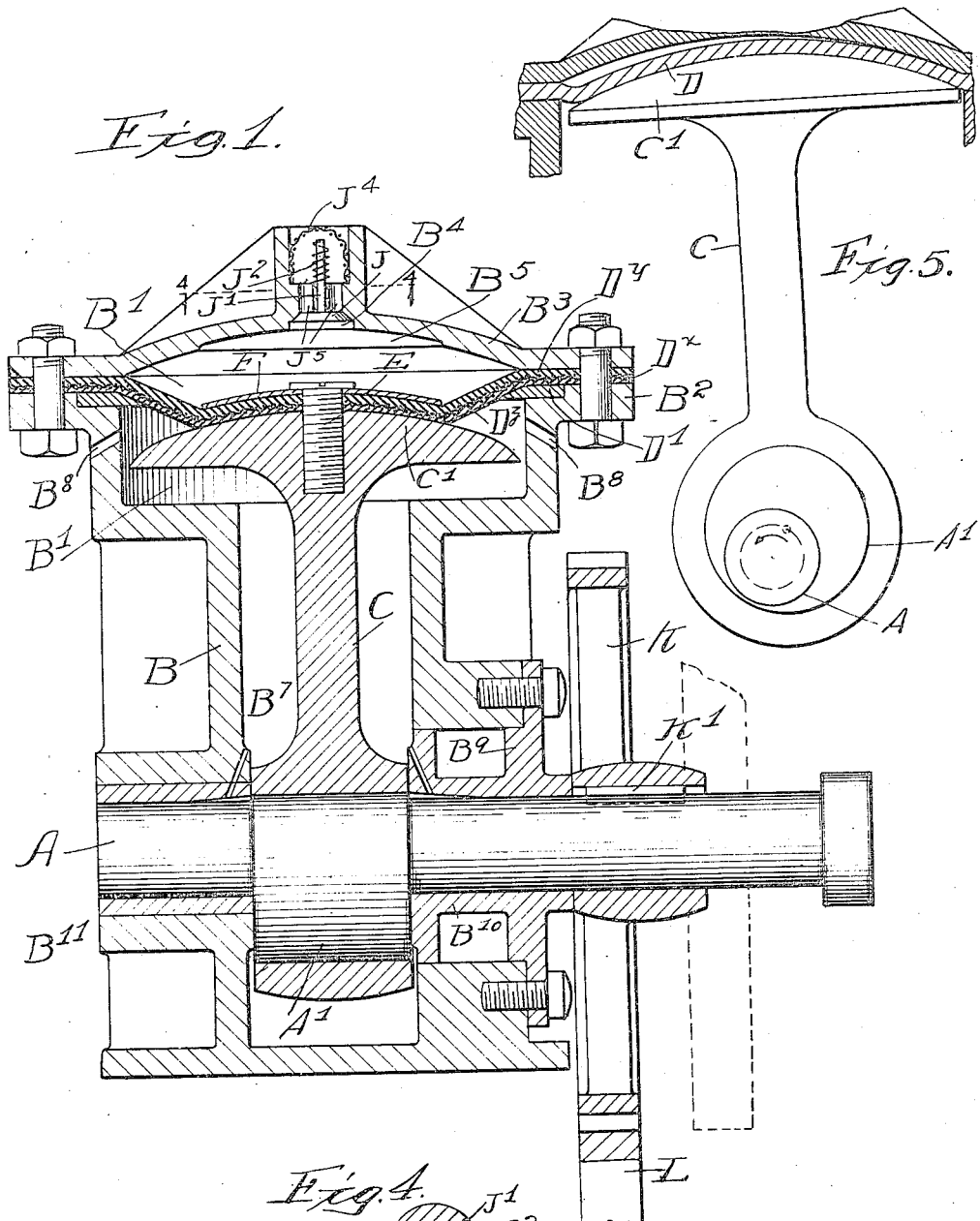

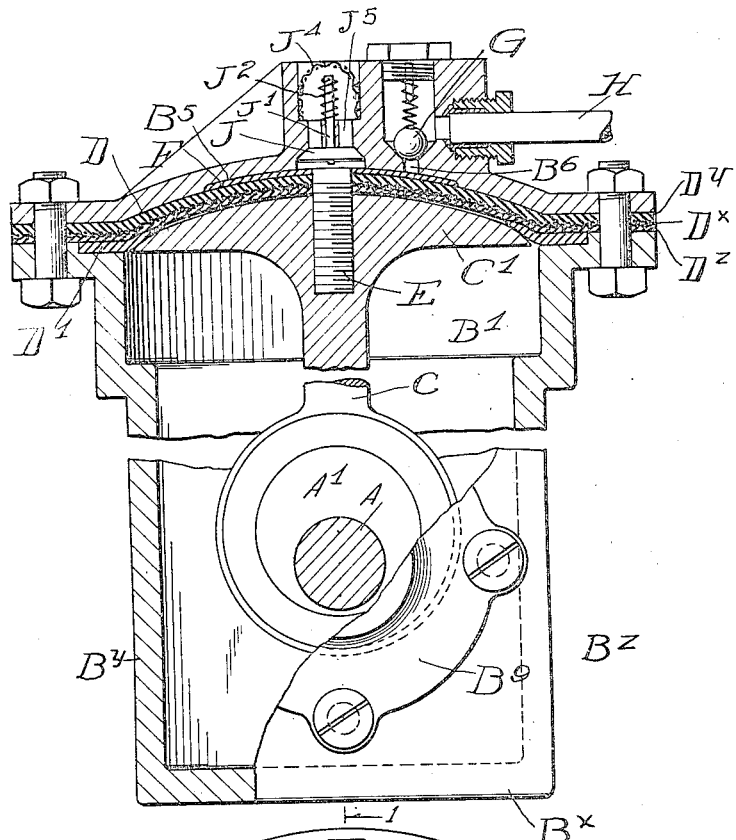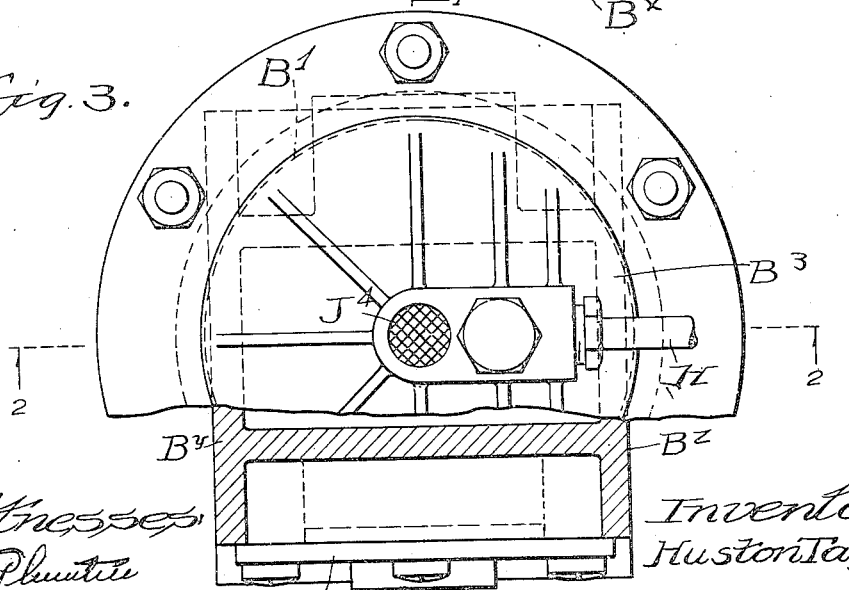

HUSTON TAYLOR, OF CHICAGO, ILLINOIS.

PNEUMATIC-TIRE PUMP.

1,198,971.   Specification of Letters Patent.   Patented Sept. 19, 1916.

Application filed May 22, 1912. Serial No. 699,080.

*To all whom it may concern:*

Be it known that I, HUSTON TAYLOR, a citizen of the United States, residing at Chicago, in the county of Cook and State of Illinois, have invented new and useful Improvements in Pneumatic-Tire Pumps, of which the following is a specification, reference being had to the accompanying drawings, forming a part thereof.

The purpose of this invention is to provide a simple and efficient pump particularly adapted for connection with the power plant of an automobile for inflating the tires of the vehicle.

It consists of the elements shown and described and their combinations as indicated in the claims.

In the drawings:—Figure 1 is a vertical section of a pump embodying this invention, being taken as indicated at line 1—1 on Fig. 3. Fig. 2 is also a vertical section of the pump, but is taken at right angles to the plane of Fig. 1, as indicated at line 2—2 on Fig. 3. Fig. 3 is a top plan view partially in section. Fig. 4 is a detail section taken as indicated at line 4—4 on Fig. 1. Fig. 5 is a diagram indicating the result of the omission of the washer, $D^1$.

The present invention is directed to providing a pump for the purpose of inflating automobile tires of the pneumatic type and avoiding defects and difficulties in the use of tire-inflating pumps heretofore common. The scope of this invention may be most directly understood by noting the difficulties and defects which it aims to overcome. These are prominently the following:—The oil employed for lubricating the pump is liable to be thrown by the pump into and past the valves into the tire itself. The tire and its valve being of rubber are thus exposed to danger of serious injury and deterioration; also, the comparatively high temperature that rapidly results from the compression of the air in pumping vaporizes more or less of the oil, so that it is carried in this form in the air into the valves and into the inflated chamber, even when in the liquid form it would not be thus transmitted. In a pump having metal packing, the oil to a large extent constitutes the packing element, and it is unavoidable in these cases that oil will be thrown into the inflated cavity with the air. Leather packing, on the other hand, becomes burned when the pump is operated at high speed or to the high pressure which is common in inflating automobile tires. The space available for such a pump on an automobile is quite limited in the direction of stroke of the pumping device, and in the pumps hitherto provided for such purposes, a very large percentage of this length is necessarily taken up in making the piston of adequate thickness in relation to its diameter, thus restricting the stroke and the capacity of the pump of given diameter. When it is sought to avoid this difficulty by a multiplicity of cylinders, complexity of construction and objectionable multiplicity of parts is unavoidable. When pumps for this purpose are operated by the automobile engine they are liable to have their leather packing burned out if the user does not observe proper care in limiting the speed of the engine during the use of the pump.

The construction which constitutes this invention is designed to overcome these difficulties and defects.

Fig. 1 shows the driving shaft, A, journaled in bearings in the housing, B, and provided with an eccentric, $A^1$, which is embraced by the lower end of the pitman, C. At the upper end the pitman is formed with a rounded head, $C^1$, to which the diaphragm, D, is bound by means of a screw, E, and a washer, F. Preferably, the upper chamber, $B^1$, of the housing is circular in horizontal section and is formed with a laterally extending flange, $B^2$. The diaphragm, D, is also circular in form and is clamped between the flange, $B^2$, and a cover-plate or head, $B^3$, while the screw, E, is positioned at substantially the center of the circular portion of the diaphragm, D, thus exposed for distortion. A flexible washer, $D^1$, of graduated thickness is lodged at the inner edge of the flange, $B^2$, and projects inwardly therefrom to reinforce the diaphragm and ease its bending over this edge.

In order to obtain high efficiency of operation the cover-plate or head, $B^3$, of the compression chamber is curved to conform closely to the shape of the diaphragm, D, at the upper limit of the stroke, being recessed at, $B^4$ and $B^5$, to accommodate the head of the screw, E, and the washer, F, respectively; the length of the pitman, C, is such as to bring the diaphragm, D, into actual contact with the head, $B^3$, as shown in Fig. 2, thus insuring the expulsion of practically all air from the compression chamber at each stroke of the pump. A ball check valve, G, controls the exhaust port, $B^6$, from which the tube, H, is provided to convey the air to the tire. The inlet valve, J, is of the puppet type, being mounted with its stem $J^1$ guided in a perforated web, $J^5$, against which a compression spring, $J^2$, operates upon the end, $J^3$, of the tem to hold the valve normally closed. A thimble-shaped screen $J^4$, serves to protect the moving parts of the valve against dust while admitting the air thereto.

It will be seen that the oil which is required for lubricating the bearings of the shaft, A, and also the pitman upon the eccentric, $A^1$, cannot possibly escape into the compression chamber formed between the diaphragm and the head, $B^3$. Therefore, if desired the space around the eccentric at, $B^7$, may be partially filled with oil and a splash system of lubrication thus employed without danger of injecting any oil into the pneumatic tube of the tire. When this is done it will be obvious that the small quantity of air surrounding the head, $C^1$, of the pitman would be subjected to temporary compression with the down-stroke of the pitman and might thus impede the action of the pump; it would at least become heated and thus tend to injure the material of the diaphragm, D, which is preferably of rubber. A more serious effect would be the tendency of the compression of air in the casing, B, to force the oil from the casing along the shaft, A, and thus cause a constant leakage and waste of oil at such points. All these dangers are, however, avoided by the provision of vent ports, $B^8$, at intervals around the upper portion of the casing, B, just below the flange, $B^2$.

The function of the flexible washer, $D^1$, is two-fold. As above stated, it serves to reinforce the diaphragm in its flexure during the down-stroke of the pitman. But, it may be noted that in the up-stroke of the pitman the peripheral portion of the pitman head would not normally seat the peripheral portion of the diaphragm, D, against the coverplate, $B^3$. In order to reduce the number of parts to the minimum the pitman is connected directly to the diaphragm, and with this construction the head of the pitman and the head of the compression chamber must be curved if the diaphragm is to be fitted snugly against the compression head at the end of the stroke. But even in such a design the curvature of the pitman must not be quite the same as that of the head, $B^3$, because of the slight obliquity which the pitman assumes during rotation of its driving eccentric. The compression head, $B^3$, is arched concentrically about the axis of the driving shaft, A, while the head, $C^1$, of the pitman is curved concentrically about the axis of the driving eccentric, $A^1$, with a radius which equals the difference between the radius of curvature of the head, $B^3$, and the eccentricity of the eccentric, $A^1$, minus also the thickness of the diaphragm, $B^3$. It is thus apparent that at the limit of the compression stroke the peripheral portion of the pitman head, $C^1$, would not force the peripheral portion of the diaphragm, D, into perfect contact with the compression head, $B^3$, and the air would consequently tend to collect toward and to distend this outer portion of the diaphragm, making its final expulsion through the exhaust valve near the center of the head somewhat difficult and uncertain. This relation of the curvature of the head, $C^1$, to the curvature of the plate, $B^3$, is indicated in Fig. 2. By reference to the diagrammatic Fig. 5, it will be noted further that just previous to the completion of the compression stroke the diaphragm would be snugly pressed against the compression head, $B^3$, at one side, but at the other side would be left free to form a pocket through which the air would almost certainly not be expelled by the finishing of the compression stroke. But, the added thickness of the washer, $D^1$, insures that the peripheral portion of the diaphragm even at this point shall contact with the compression head, $B^3$, slightly in advance of the finish of the up-stroke, so that the air is forced toward the center of the cover plate instead of away from it and can escape easily through the exhaust valve.

Another special feature is the extension of the metallic washer, F, to cover that portion of the diaphragm opposite the exhaust valve, G. It is well known that at the limit of a compression stroke the temperature of the air is greatly increased by its compression, and it will be seen that if the diaphragm, D, were left unshielded the current of heated air rushing over it to escape through the exhaust valve would rapidly deteriorate the rubber and might even burn it out at this point; furthermore, the rim of the exhaust port being highly heated by the heated air would also tend to burn the rubber as the latter came in contact with it at the finish of the stroke. But this is avoided by extending the metal washer, F, considerably beyond the position of the exhaust valve so as to shield the rubber from the heated air escaping at this point, and to prevent actual contact of the diaphragm with the rim of the exhaust port.

The driving connections between the pump and its motive power may be of any convenient type, Fig. 1 suggesting a spur gear, K, on the shaft, A, operatively connected thereto by means of a key, $K^1$, and meshing with a driving gear, L. The shaft, A, is sufficiently extended to receive the gear, K, when the latter is slid out of engagement with the key, $K^1$, and out of mesh with the gear, L, for disconnecting the pump from the vehicle motor. Since a spur gear or pulley-drive would in most cases be preferable to bevel gears or other connections in which the pump shaft would be otherwise than parallel to the power shaft, the housing or casing, B, is preferably designed with at least two of its walls at right angles to each other and parallel to the axis of the pump shaft. As shown, there are three walls fulfilling this condition, namely, the bottom, $B^x$, and the two side walls, $B^y$ and $B^z$. Since a considerable portion of each of these walls is a mere flange and does not form a part of the actual crank case, they may be drilled or tapped to receive securing bolts and thus serve to simplify the problem of attachment of the pump to the motor or frame of the vehicle. Preferably the eccentric, $A^1$, is formed upon the shaft, A, and to permit the insertion of the shaft it becomes necessary to make one of its journal bearings removable; the crank case is formed at one side with a journal bearing, $B^{11}$, but at the other side an opening is left having a radius slightly greater than the radius of the eccentric, $A^1$, plus its eccentricity. This permits insertion of the shaft and eccentric, and the opening is closed by a cover-plate, $B^9$, which carries the other journal bearing, $B^{10}$, for the shaft, A.

It will be understood that for the purpose indicated this pump is required to work at comparatively high pressure,—that is, up to 100 pounds per square inch, or more, and that, accordingly, the diaphragm, D, is subjected to very hard usage by reason of the high pressure to which it is frequently operated. The face of the diaphragm which is toward the compression chamber must be capable of resisting such high temperatures as are produced by the compression of the air and its rapid expulsion, while the other side of the diaphragm must be unaffected by the action of the lubricating oil which is liable to splash against it from the crank case. At the same time, the material of the diaphragm must be gas-tight, and, preferably should be somewhat compressible and elastic in the direction of its thickness to prevent pounding of the pump as the pitman reaches the limit of its stroke and the diaphragm is forced into contact with the head of the compression chamber. For these reasons a special material is produced for the purpose by over-laying one surface of a woven fabric, $D^x$, with a specially treated rubber, $D^y$, which is capable of resisting heat, and by applying to the other surface of the fabric, $D^x$, a different quality of rubber, $D^z$, so compounded as to be unaffected by oil. The majority of the thickness of the diaphragm, D, is made up of the rubber, $D^y$, this being the more elastic and compressible of the two surface materials. Both layers of rubber, $D^y$ and $D^z$, are secured to the fabric, $D^x$, by a vulcanizing process which prevents all danger of separation of the layers and thus renders the diaphragm sheet unitary so far as operation is concerned.

I claim:—

1. An air compressor comprising a compression chamber composed of a concavely rounded compression head and a flexible diaphragm opposing it, together with means for reciprocating the diaphragm toward and from said head, including a rotary shaft having an eccentric portion, a convexly rounded follower secured to the diaphragm, and a connecting rod rigid therewith journaled upon the eccentric portion of the shaft, the trace of said compression head upon a bisecting plane perpendicular to the shaft axis being a circular curve centered in said axis, and the trace of the follower head upon said plane being a circular curve centered in the axis of the shaft eccentric, adapting the follower to be rolled across the compression head with the diaphragm interposed as the eccentric passes through dead center position.

2. An air compressor comprising a compression chamber composed of a concavely rounded compression head and a flexible diaphragm opposing it, together with means for reciprocating the diaphragm toward and from said head, including a rotary shaft having an eccentric portion, a convexly rounded follower secured to the diaphragm, and a connecting rod rigid therewith journaled upon the eccentric portion of the shaft, the trace of said compression head upon a bisecting plane perpendicular to the shaft axis being a circular curve centered in said axis, and the trace of the follower head upon said plane being a circular curve centered in the axis of the shaft eccentric, the compression head radius being substantially the sum of the follower radius, the diaphragm thickness, and the eccentricity of the shaft eccentric, to insure close rolling engagement of the follower and compression head with the diaphragm interposed at the end of the compression stroke.

3. In a diaphragm pump, a pitman having rigid with it a convexly rounded head secured to the central portion of the diaphragm, a concavely rounded compression head formed to permit the pitman head to roll against it with the diaphragm interposed at one limit of the stroke of the pitman, an exhaust port located in the central portion of said compression head, and means effectively thickening the diaphragm at the portion proximate to the periphery of the pitman head for insuring early contact of this portion with the compression head.

4. In a pneumatic tire pump, comprising two chambers, a flexible and elastic diaphragm separating said chambers, a driving shaft having an eccentric and a pitman operatively connected thereto in one chamber, said pitman having a head whose area is substantially equal to the area of the diaphragm exposed toward it, means securing the central part of said diaphragm to said head of the pitman, a compression head for the other chamber having its inner wall arched concentrically about the center of the driving shaft, the pitman head being circularly curved about the center of the driving eccentric with a radius equal to the difference between the radius of curvature of the compression head and the eccentricity of said eccentric, minus approximately the thickness of the diaphragm, means securing the central part of the diaphragm to said head, the compression head having an exhaust port in its central portion, means interposed between the diaphragm and the pitman head at their peripheral portions effectively thickening the diaphragm to insure contact of this portion with the compression head before the end of the pitman stroke, and inlet and exhaust valves for the compression chamber.

5. In a pneumatic tire pump, a flexible and elastic diaphragm, a flanged housing and a flanged cover-plate therefor, said diaphragm being clamped between the flanges of the housing and the cover-plate, a pitman mounted for movement toward and from the cover-plate; means securing a central portion of the diaphragm to said pitman, and a flexible washer lodged in one of the flanges between which the diaphragm is clamped and projecting inwardly therefrom for reinforcing the diaphragm in flexure.

6. An air compressor comprising a compression head having a curved inner surface, a flexible diaphragm opposing the head and in sealed relation therewith, a follower for the diaphragm, the face of the follower which is adjacent the diaphragm being curved reversely to the curvature of the inner surface of the head and at a different degree than that of the latter, and means for causing the follower to approach the head by a simultaneous reciprocating and swinging movement, whereby the diaphragm is caused to positively rock across and is forced into close engagement with the curved inner surface of the head throughout.

7. An air compressor comprising a compression head having a concavely rounded inner surface, the curvature of which is a circular arc, a flexible diaphragm opposing the head and in sealed relation therewith, a follower secured to the diaphragm, the face of the follower which is adjacent the diaphragm being convexly curved in a circular arc of less radius than that of the arc of the head, and means for causing the follower to approach the head by a simultaneous reciprocating and swinging movement, whereby the diaphragm is forced into close engagement with the curved surface of the head throughout.

8. An air compressor comprising a compression head having its inner surface curved in the arc of a circle, a flexible diaphragm opposing the head and in sealed relation therewith, a follower for the diaphragm, the face of the follower which is adjacent the diaphragm being curved in the arc of a circle of radius different from that of the first mentioned circle, the centers of curvature of the two circles being on the same side of the diaphragm, an eccentric for imparting to the follower a combined reciprocating and swinging movement, the difference in the length of the radii of the two circles being substantially equal to the eccentricity of the eccentric plus the thickness of the diaphragm.

9. A compressor comprising means for forming one wall of a chamber, the inner surface of said wall being curved, a flexible diaphragm constituting the opposite wall of the chamber, a follower for the diaphragm, said follower being curved on the side next the diaphragm, and means for causing the follower to rock across the first mentioned wall whereby the diaphragm is gradually brought into close engagement with said wall.

10. A compressor comprising means for forming one wall of a chamber, the inner surface of said wall being curved, a flexible diaphragm constituting the opposite wall of the chamber, a follower for the diaphragm, said follower being curved on the side next the diaphragm, and means whereby the follower is caused to approach the first mentioned wall until the diaphragm contacts therewith at one side and to thereafter positively rock until the diaphragm is in full engagement with said wall, said means thereafter drawing the diaphragm away from the curved inner surface of the wall.

11. A compressor comprising means for forming one wall of a compression chamber, a flexible diaphragm constituting the opposite wall of the chamber, a follower for the diaphragm, and means for positively causing the follower to rock across the first mentioned wall whereby the diaphragm is brought into close engagement with said wall throughout and the fluid in the chamber is expelled.

12. A compressor comprising means for forming one wall of a compression chamber, a flexible diaphragm constituting the opposite wall of the chamber, a follower for the diaphragm, and means for positively causing the follower to approach and afterward rock across the first mentioned wall whereby the diaphragm is brought into close engagement with said wall throughout and the fluid in the chamber is expelled.

13. A compressor comprising means for forming one wall of a compression chamber, a flexible diaphragm constituting the opposite wall of the chamber, a follower for the diaphragm, an operating shaft including an eccentric, a connecting rod journaled on the eccentric, said connecting rod being rigid with the follower, the parts being so proportioned that the follower is first caused to approach the first mentioned wall until the diaphragm is in close engagement therewith and afterward caused to positively rock across said wall while maintaining the diaphragm in close engagement with said wall whereby the fluid in the chamber is expelled.

14. A compressor comprising means for forming one wall of a compression chamber, the compression surface of said wall intersecting each of a plurality of parallel planes a plurality of times, a flexible diaphragm constituting the opposite wall of the chamber, a follower for the diaphragm, the compression surface of said follower also intersecting each of a plurality of parallel planes a plurality of times, and means for positively causing the follower to rock across the first mentioned wall in such manner that the diaphragm is first brought into close engagement with the compression surface of the first mentioned wall at one point and afterward successively forced into close engagement with the other portions of said surface whereby the fluid in the chamber is expelled.

In testimony whereof I have hereunto set my hand at Chicago, Illinois, this 20th day of May, 1912.

HUSTON TAYLOR.

Witnesses:
   ROBT. N. BURTON,
   EDNA M. MACINTOSH.